US010630680B2

(12) United States Patent
Arrowood et al.

(10) Patent No.: US 10,630,680 B2
(45) Date of Patent: Apr. 21, 2020

(54) SYSTEM AND METHOD FOR OPTIMIZING MATCHED VOICE BIOMETRIC PASSPHRASES

(71) Applicant: Nice Ltd., Ra'anana (IL)

(72) Inventors: Jon A. Arrowood, Smyrna, GA (US); Peter S. Cardillo, Atlanta, GA (US); Robert William Morris, Decatur, GA (US)

(73) Assignee: Nice Ltd., Ra'anana (IL)

( * ) Notice: Subject to any disclaimer, the term of this patent is extended or adjusted under 35 U.S.C. 154(b) by 251 days.

(21) Appl. No.: 15/719,701

(22) Filed: Sep. 29, 2017

(65) Prior Publication Data

US 2019/0104120 A1 Apr. 4, 2019

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01)

(58) Field of Classification Search
CPC .............................. H04L 63/0861; G06F 21/32
See application file for complete search history.

(56) References Cited

U.S. PATENT DOCUMENTS

| 2005/0125226 | A1* | 6/2005 | Magee | G06F 21/32 704/246 |
| 2011/0276323 | A1* | 11/2011 | Seyfetdinov | G06F 21/32 704/207 |
| 2014/0188468 | A1* | 7/2014 | Dyrmovskiy | G10L 17/04 704/235 |
| 2018/0060557 | A1* | 3/2018 | Valenti | G10L 15/06 |

* cited by examiner

*Primary Examiner* — Jeffrey C Pwu
*Assistant Examiner* — Thong P Truong
(74) *Attorney, Agent, or Firm* — Pearl Cohen Zedek Latzer Baratz LLP

(57) ABSTRACT

Systems and methods for optimizing matched voice biometric passphrases may generate a set of k candidate passphrases; calculate a phonetic content of each candidate passphrase of the set of k candidate passphrases; at least one of during and after a voice biometric enrollment of a user, calculate a user phonetic content of a text-independent voiceprint of the user, wherein the text-independent voiceprint of the user was captured during the voice biometric enrollment; identify a subset of j passphrases from the set of k candidate passphrases, wherein each of the subset of j passphrases meets a match threshold in phonetic content with the voiceprint of the user; one of prior to and during a user authentication, select a first one of the subset of j passphrases; and present the selected first one of the subset of j passphrases to the user for use in the user authentication.

18 Claims, 3 Drawing Sheets

SYSTEM AND METHOD FOR OPTIMIZING MATCHED VOICE BIOMETRIC PASSPHRASES

FIELD OF INVENTION

The present invention relates to the field of biometric security. More specifically, the present invention relates to systems and methods for optimizing matched voice biometric passphrases.

BACKGROUND

In self-service or interactive voice response (IVR) channels, it would be valuable to improve security and reduce fraud by using voice biometrics to help authenticate users. This is typically done by the use of "active authentication": prompting the user for a passphrase, and comparing it to a voice biometric model of the person. An authentication is typically performed based on an identified user (or the alleged identification of a user). For example, a user may be authenticated by determining or accepting an alleged identification for a user, determining authentication information corresponding to the user (e.g., password, biometric information), and determining whether or not a match exists between input and stored authentication information. A passphrase, as described herein, may be for example a sequence of words or other text used for access control which is similar to a password in usage, but is generally longer for added security.

One example way to perform this with high accuracy is to enroll a customer during one interaction, by prompting the customer to say or vocalize a specific passphrase one or more times, recording it, and creating a model of the user saying this phrase. During a future interaction, the user is prompted to say this same passphrase, which is compared to the enrollment, and gives a score as to whether or not the user is the same as the user who provided the passphrase during enrollment.

There are two problems with the above scenario. First, customers are not motivated to go out of their way to go through the enrollment process. Second, passphrases cannot change without a new enrollment phase.

An alternate process is to use a text-independent voice biometric model that created passively from observed speech in a historical call, so that the enrollment stage is skipped. As understood herein, text-independent enrollment refers to situations in which no defined script or predefined choice of text or words is required for a voice biometric model to be generated, e.g., generation of the voice biometric model is not dependent on the speaker actively articulating specific predefined text, as would be the case for a text-dependent voice biometric model. Both problems are solved, as explicit enrollment is no longer necessary, plus the model can now be used against any phrase. Using this process, passphrases can be changed at any time, which of itself is a large gain to security, as pre-recording a passphrase is more difficult, since a fraudster does not know until the time of the call what the passphrase will be.

This alternate process, however, has a significant drawback of its own: accuracies of text-independent systems on very short segments of speech are lower than text-dependent systems in which specific predefined text is verbalized, spoken, articulated, etc.

What is needed therefore is a system and method that addresses the loss of accuracy when using a text-independent voice biometric system in an active authentication scenario.

SUMMARY OF EMBODIMENTS OF THE INVENTION

An embodiment of the invention includes a system and method for optimizing matched voice biometric passphrases. Embodiments may be performed on a computer, for example, having a processor, memory, and one or more code sets stored in the memory and executing in the processor. In some embodiments, the method may include generating a set of k candidate passphrases; calculating a phonetic content of each candidate passphrase of the set of k candidate passphrases; at least one of during and after a voice biometric enrollment of a user, calculating a user phone content of a text-independent voiceprint of the user, in which the text-independent voiceprint of the user was captured during the voice biometric enrollment; identifying a subset of j passphrases from the set of k candidate passphrases, in which each of the subset of j passphrases meets a match threshold in phonetic content with the voiceprint of the user; one of prior to and during a user authentication, selecting a first one of the subset of j passphrases; and presenting (e.g. via an output device) the selected first one of the subset of j passphrases to the user for use in the user authentication.

In some embodiments, calculating the phonetic content of each candidate passphrase of the set of k candidate passphrases may include: comparing each candidate passphrase of the set of k candidate passphrases against a pronunciation lexicon; based on the comparison, identifying the pronunciation of each phoneme in each candidate passphrase of the set of k candidate passphrases; and generating a phoneme string representing each candidate passphrase of the set of k candidate passphrases.

In some embodiments, identifying the subset of j passphrases from the set of k possible passphrases may include: ranking the set of k possible passphrases by similarity in phonetic content with the voiceprint of the user; and selecting the subset of j passphrases which meet the match threshold in phonetic content with the voiceprint of the user. In some embodiments, calculating the phonetic content of the text-independent voiceprint of a user may include comparing the text-independent voiceprint against a pronunciation lexicon; based on the pronunciation lexicon, identifying the pronunciation of each phoneme in the text-independent voiceprint; and generating a phoneme string representing the text-independent voiceprint.

In some embodiments, calculating the phonetic content of the text-independent voiceprint of a user may include extracting a Universal Background Model (UBM) state occupancy vector from the text-independent voiceprint; and based on the UBM state occupancy, generating a phoneme string for the text-independent voiceprint. Some embodiments of the method may further include transforming the phonetic content of each candidate passphrase of the set of k candidate passphrases into an estimated state occupancy vector; comparing the distance between each estimated state occupancy vector and the Universal Background Model (UBM) state occupancy vector; ranking each candidate passphrase of the set of k candidate passphrases based on the distance; and selecting the subset of j passphrases within a threshold distance.

In some embodiments, the method may include: prompting the user to verbally articulate the selected first one of the subset of j passphrases to the user for use in the user authentication; and authenticating the user based on the verbally articulated selected first one of the subset of j passphrases and the voiceprint of the user.

In some embodiments, the method may include: selecting, by the processor, a second one of the subset of j passphrases; and presenting the selected second one of the subset of j passphrases to the user for use in a subsequent user authentication. In some embodiments, at least one of the first one of the subset of j passphrases and the second one of the subset of j passphrases may be selected randomly.

In accordance with further embodiments, systems may be provided, which may be configured to perform embodiments of the methods described herein. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
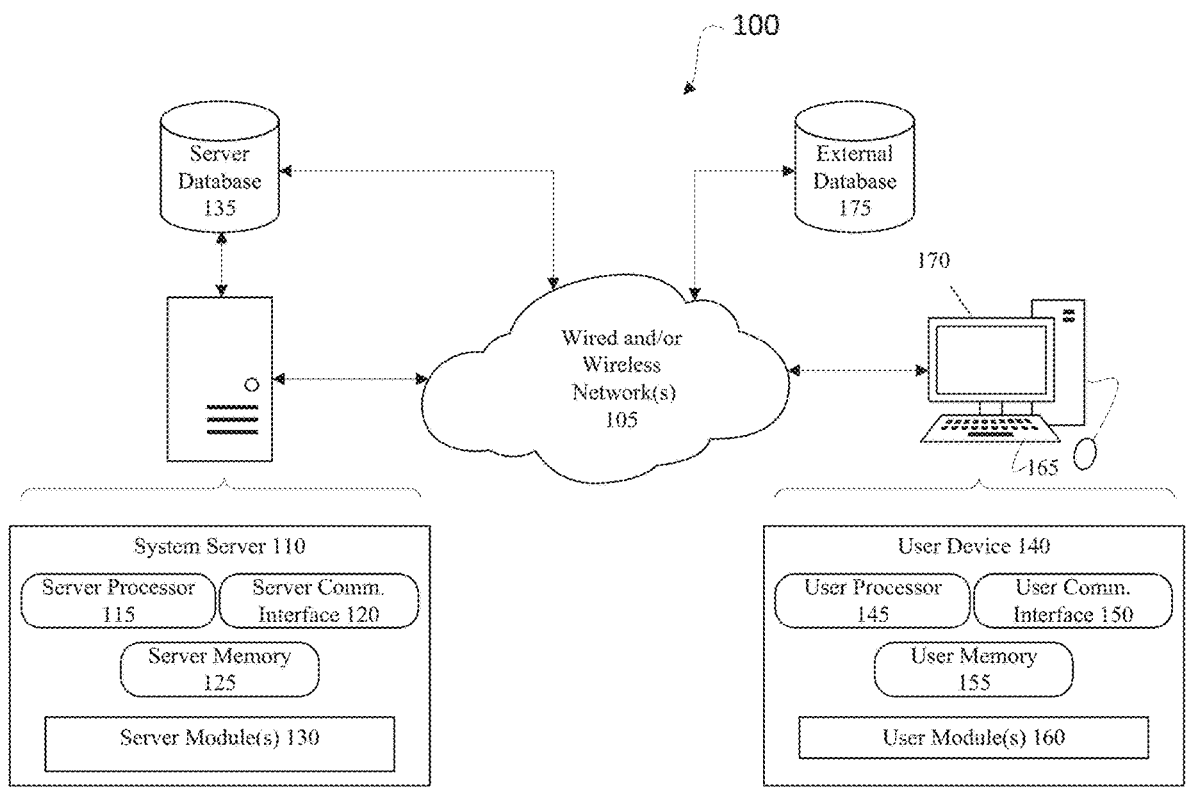
FIG. 1 is a high level diagram illustrating an example configuration of a system for optimizing matched voice biometric passphrases according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention include systems and methods for optimizing matched voice biometric passphrases. In doing so, embodiments may solve the problem of lower accuracy during short text-independent voice biometrics, for example, by the intelligent selection of a passphrase presented to each user by selecting phrases that maximize the accuracy of voice biometrics, specifically for that user.

The systems and methods according to some embodiments as described herein are based on two observations: (1) Text-Dependent voice biometrics is known to be more accurate than text-independent approaches due to the lexical match or correlation between the enrollment phase and the authentication phase (as compared with the lexical mismatch in Text-Independent voice biometrics). The implication is that because the same sounds are present in both the enrollment and trial (authentication) phases, algorithms are able to make better comparisons. (2) The phonetic content (e.g., how a passphrase might be pronounced, e.g., by a given or representative individual or set of individuals) of a text-independent model can be determined.

Using these observations, the following general example process can be implemented according to some embodiments of the invention: (1) Generate a very large pre-defined set of k possible passphrases; (2) Calculate the phonetic content of each of the possible passphrases; (3) During and/or after enrollment, calculate the phonetic content of a text-independent voiceprint; (4) During an authentication: find the voiceprint of the customer, find a subset of j passphrases from the set k which have the best match or correlation in phonetic content with the voiceprint, select (e.g., randomly) one of these j phrases, and present the selected phrase to the customer. In other embodiments, other operations may be performed.

Various embodiments of the above example process may avoid active enrollment, allow every interaction to use an unpredictable passphrase, and, because lexical match is preserved, enable accuracy can still remain high. Other or different benefits may be provided.

Embodiments of the invention may differ from existing solutions at least in that these embodiments may derive information from each specific voice biometric model in order to determine which passphrases are more likely to give accurate results with the specific voice biometric model. In order to accomplish this, embodiments of the invention may employ knowledge of both voice biometrics (e.g., to understand that lexical mismatch is causing the drop in accuracy for text-independent solutions) and phonetics and speech recognition (e.g., to understand that lexical mismatch can be predicted) in combination with, e.g., a random-passphrase active authentication system, as described herein.

Figure 2:
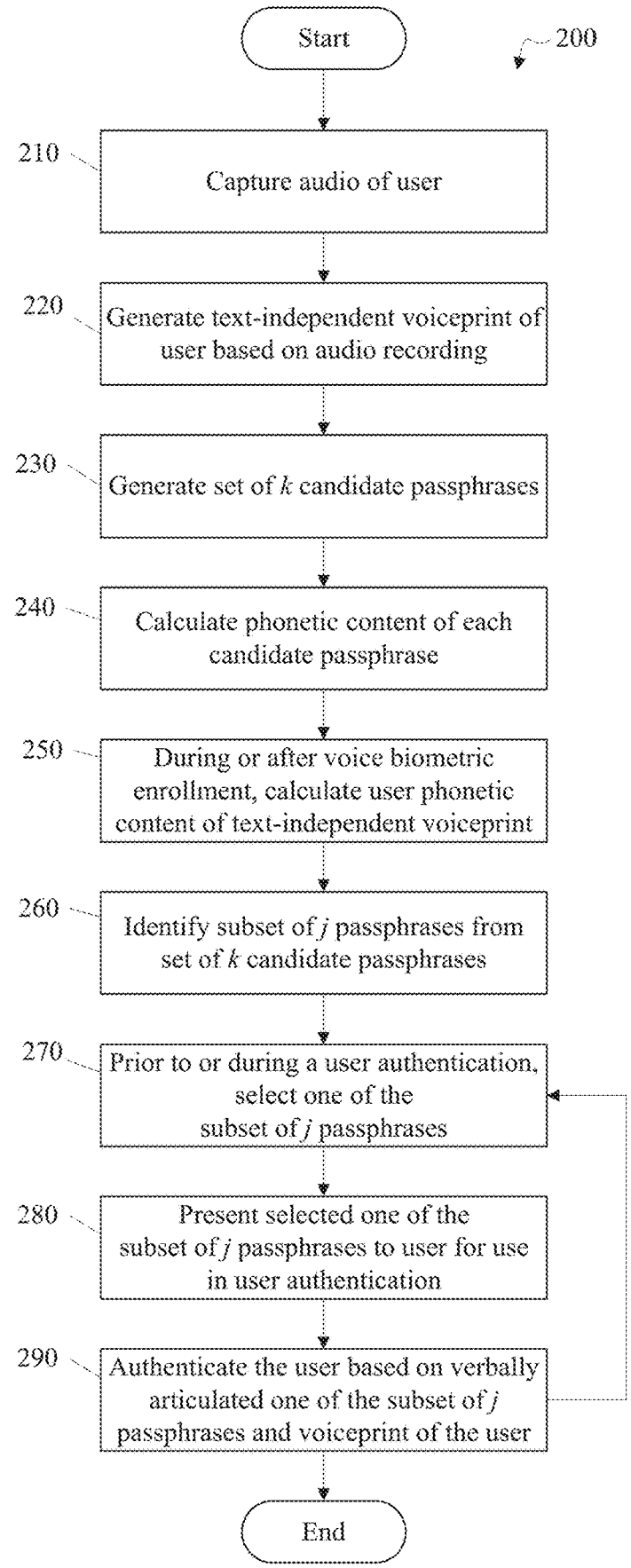
FIG. 2 is a high level diagram illustrating an example method for optimizing matched voice biometric passphrases according to at least one embodiment of the invention.
Figure 3:
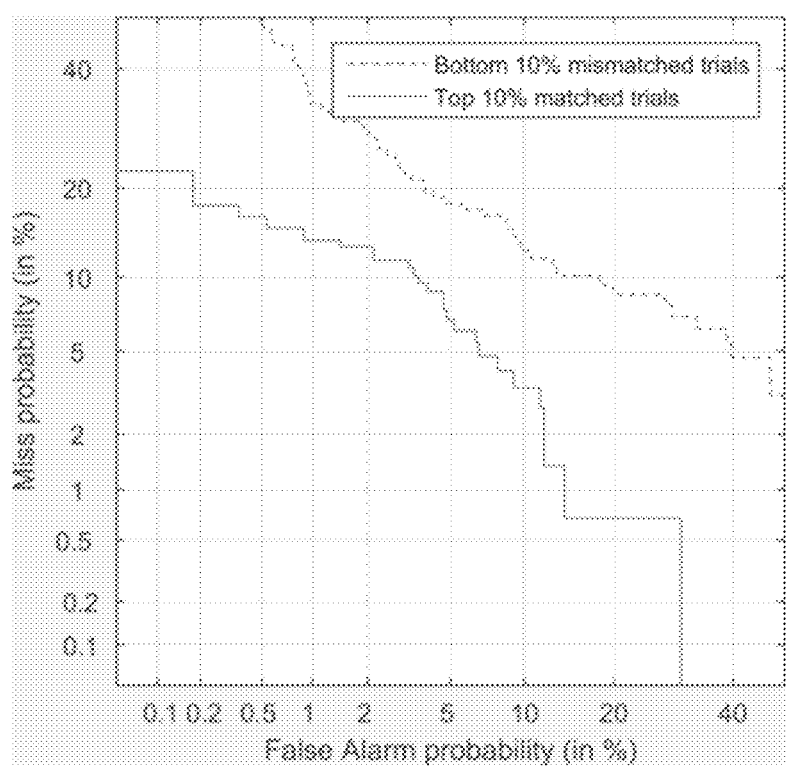
FIG. 3 is a chart showing detection error rates for matched state occupancies versus mismatched state occupancies according to at least one embodiment of the invention.

These and other features of embodiments of the invention will be further understood with reference to FIGS. 1-3 as described herein.

FIG. 1 shows a high level diagram illustrating an exemplary configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system, e.g., located at and/or operated by a call center. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In accordance with embodiments of FIG. 1, the exemplary software modules may include a communication module and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are, therefore, intended to be representative of the various functionalities of system server 110 in accordance with some embodiments of the invention. It should be noted that, in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database (s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 140 may be any standard computing device, e.g., operated by a user such as a customer or potential customer. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

FIG. 2 is a high level diagram illustrating an example configuration of a method workflow 200 for optimizing and/or creating matched or correlated voice biometric passphrases according to at least one embodiment of the invention. As described herein, some embodiments of systems and methods of the invention are configured to be integrated in and/or with a voice biometric active authentication system.

In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins at step 210, when audio of a user is captured and/or recorded during a historical call. In some embodiments, a user may be a customer or potential customer, for example, of a company employing systems and/or methods described herein, and the audio may be captured and/or recorded, for example, during a call between a user and a live agent and/or an interactive voice response (IVR) automated telephony system, e.g., of a call center of the company. In some embodiments, all or a portion of a call may be captured for real-time analysis and/or recorded and/or saved, e.g., in a database, for post-call analysis, as described herein.

At step 220, in some embodiments, the processor may generate a text-independent voiceprint of the user based on the audio capturing/recording. As understood herein, a voiceprint may be a set of measurable characteristics of a human voice that uniquely identifies an individual. These characteristics, which may be based, e.g., on the physical configuration of a speaker's mouth and/or throat, and/or the way a speaker articulates text, may be represented, e.g., as a mathematical formula, a graphical representation, etc. In some embodiments, the term voiceprint may apply to a vocal sample recorded for that purpose, the derived mathematical formula, and/or its graphical representation. In some embodiments, a text-independent voiceprint may be created or generated passively from observed speech in a historical call using a text-independent voice biometrics engine such as, for example, that of the Real-Time Authentication (RTA) system of NICE Systems, Inc., e.g., as part of a voice biometric enrollment.

At step 230, in some embodiments, the processor may generate a set of k candidate passphrases, e.g., a plurality of candidate phrases, each candidate phrase containing, e.g., one or a plurality of words. In some embodiments, the processor may implement or execute, e.g., a random passphrase generator, which may generate random passphrases as required, such as, for example: "Aardvarks eat ants.", "Aardvarks like bee honey.", "An aardvark can swim.", etc. In some embodiments, passphrases need not be coherent but should be articulable, e.g., able to be spoken. In some embodiments, candidate passphrases may be at least a predetermined number of time units long when spoken, e.g., 3 seconds, 5 seconds, etc. In some embodiments, the random passphrase generator may comprise a list of, e.g., 10,000 or 100,000, etc., words or phrases from which one or more words or phrases may be chosen or selected by the processor, e.g., at random, and provided or otherwise presented as a candidate passphrase. In some embodiments, a third-party random passphrase generator may be implemented. In some embodiments, candidate passphrases may be generated, for example, by use of mathematical algorithms in which one or more "seed" words or numbers may be used as input(s) and a passphrase may be generated as an output. Of course, it will be understood by those of ordinary skill in the relevant art that in some embodiments, candidate passphrases may be generated randomly, pseudo-randomly, and/or cryptographically, or by any other suitable method. Such generated candidate passphrases may be stored, for example, in a candidate passphrase database for possible use as described herein.

At step 240, in some embodiments, the processor may calculate a phonetic content of each candidate passphrase of the set of k candidate passphrases, e.g., a phoneme sequence of each phrase. For example, in some embodiments, the processor may implement, e.g., a phonetic content analysis engine, which may compare each candidate passphrase of the set of k candidate passphrases against a pronunciation lexicon, and calculate, compute, generate, or otherwise identify the phonetic content of each candidate passphrase of the set of k candidate passphrases identify or determine the phoneme sequence associated with each candidate passphrase of the set of k candidate passphrases). As understood herein, phonetic content may be a particular articulable set of sounds associated with pronunciation of a text, e.g., from a linguistic perspective. In some embodiments, the processor may generate a representation of the phonetic content of each candidate passphrase, e.g., in the form of, for example, a phoneme string, or, more generally, a phonetic lattice.

By way of example, for the passphrase "did you," the processor may generate a phoneme string such as "_d _ ih_d_y_uw." Of course, those of ordinary skill in the relevant art will understand that there may be more than one way to pronounce a phrase such as the example passphrase "did you." Therefore, in some embodiments, a model of the phonetic content (explained in detail herein) might include, e.g., in the alternative, the sequence above as well as the phoneme string "_d _ih_d_d _jh_ah," for example. Furthermore, in some embodiments, each candidate passphrase may be represented more generally than just as a set of alternative ("OR") distinct sequences; the pronunciation may be represented by a phonetic lattice, which may be effectively a graph or other representation with weights assigned. Using the above example passphrase "did you," the first three (3) phonemes ("_d _ih_d") are the same, but there may be, e.g., a 68% chance of taking the more conversational branch "_jh_ah" and a 32% chance of taking the more formal branch of "_y _uw."

In some embodiments, the phonetic content of each candidate passphrase may be calculated by implementing a pronunciation lexicon, which may be, e.g., a list of all words used in the k candidate phrases, and an indication of how each of these words is pronounced, e.g., in phonemes. For example, a pronunciation lexicon may include example entries, e.g., phoneme strings, such as: "AARDVARK→aa-r-d-v-aa-r-k"; "AARON→ey-r-ih-n"; "ABACUS→ae-b-ae-k-ah-s"; etc. In some embodiments, entries may be used, e.g., by the phonetic content analysis engine, to generate a phonetic content model of each candidate passphrase of the set of k candidate passphrases. In some embodiments, a phonetic content model may be a numerical, visual, structural or other representation of the phonetic content.

At step 250, in some embodiments, the processor may calculate the phonetic content of a text-independent voiceprint of the user, e.g., a user phoneme sequence of a text-independent voiceprint of a user, for example, the text-independent voiceprint of the user captured/recorded during a voice biometric enrollment. In some embodiments, the processor may calculate the phonetic content of a text-independent voiceprint of the user during (e.g., concurrently with) capturing/recording of the text-independent voiceprint. In some embodiments, the processor may calculate the phonetic content of a previously captured/recorded text-independent voiceprint of the user after text-independent voiceprint has been captured/recorded.

In some embodiments, the processor may calculate the phonetic content of the text-independent voiceprint of the user by employing a phonetic content analysis engine in which the voiceprint is an input and a representation of the user phonetic content is an output. This may be accomplished by the processor in a variety of ways, as would be understood by those of ordinary skill in the art. For example, in some embodiments, the processor may instantiate an automated speech recognition (ASR) system (as would be commonly employed by those of ordinary skill the art) to analyze the audio used to create the text-independent voiceprint, identify text in the audio, and, e.g., store the identified text with the text-independent voiceprint. In this and other embodiments, the processor may then calculate user phonetic content of the identified text in the manner described herein for calculating the phonetic content of each candidate passphrase. As in step 240, the input may be text, and the output may be, e.g., a phoneme string, or, more generally, a phonetic lattice.

In some embodiments, the processor may instead and/or in addition be configured to keep track of the state occupancies (explained herein) for each of the Gaussian Mixture Model (GMM) mixtures in the Universal Background Model (UBM) used in standard i-vector-based voice biometric engines. As understood herein, a GMM is a probabilistic model that assumes all the data points are generated from a mixture of a finite number of Gaussian distributions with unknown parameters. As understood by those of ordinary skill in the art, the UBM is a model used in a biometric verification system to represent general, person-independent feature characteristics to be compared against a model of person-specific feature characteristics when making an accept or reject decision. For example, in a speaker verification system, the UBM may be a speaker-independent GMM trained with speech samples from a large set of speakers to represent general speech characteristics.

In some embodiments, a Gaussian Mixture Model may have K states (e.g., K=1,000 or K=2,000, etc.), each of which models some region in acoustic space (conceptually, this is like having 1,000 'types' of sounds). These models are typically trained in an un-labeled manner, such that GMM states do not directly reference phonemes, although it is possible to use labeled data to directly make such associations as well. In some embodiments, a matrix may be generated which may include e.g., a horizontal dimension representing time, and e.g., a vertical dimension representing the GMM states. In the time dimension, there may be, for example, 100 entries per second. In this example, for a 10-second piece of speech, there will be a 1,000-by-K matrix. For each element in this matrix, the likelihood that the sound represented by state i occurs at time t may be calculated. In some embodiments, a "state occupancy" for each of the K states may be calculated by summing these likelihoods in the horizontal direction. In some embodiments, a state occupancy may be calculated by applying a threshold, converting all elements to a '0' or '1', and summing across states. In some embodiments, a state occupancy may be calculated by implementing a Viterbi backtrace to calculate the single best path, only counting the single best state in each column as a '1' and all others as a '0', and again summing across the rows. Irrespective of the particular embodiment, in the end, a K-element column vector that has some notion of how much time was spent in each of the K states may be determined.

An occupancy vector is inherently calculated as a part of UBMs, but normal voice biometrics systems typically do not retain this information. In some embodiments, this vector may be a 1-by-n vector, with n equal to the number of Gaussian Mixtures present in the UBM. Often, n is 1024 or 2048, but other values are possible. Therefore, in some embodiments, this occupancy vector may be retained and embedded in, and/or otherwise stored as a part of, in association with, or in conjunction with, the text-independent voiceprint. For example, in some embodiments, an occupancy vector may be embedded into a voiceprint by appending it to the voiceprint so that the two become a single binary object (e.g., placing each of their bytes together). In some embodiments, therefore, the processor may use the text-independent voiceprint as input, extract the occupancy information from otherwise identify the associated occupancy vector), and return this as the output phonetic content of the text-independent voiceprint.

At this point, according to the various embodiments described above, user authentication may be performed in accordance with further embodiments, as described herein. For example, once a user (e.g., a customer or potential customer) has been enrolled as described above, based, e.g., on a historic call, the user may now be authenticated (e.g., affirmatively identified) during a future call, as described herein.

In some embodiments, at step 260, e.g., in order to authenticate the user during a user identification, the processor may identify a subset of j passphrases from the set of k candidate passphrases, in which each of the subset of j passphrases meets or equals (and/or exceeds) a match threshold in phonetic content with the voiceprint of the user, as described herein. To execute this, in some embodiments, the processor may compare the phonetic content of each of the k candidate passphrases with the user phonetic content of the text-independent voiceprint, for example as described herein.

In some embodiments, the processor may generate a rank-ordering (e.g., ranking) of each of the input k candidate passphrases (e.g., dynamically in real-time or after completion of all comparisons), based on how similar the phonetic content of each of the k candidate passphrases correlates to or matches the user phonetic content of the voiceprint (e.g., ranking, by the processor, the set of k possible passphrases by similarity in phonetic content with the voiceprint of the user), as described herein. In various embodiments, the processor may implement one or more scoring techniques to rank the k candidate passphrases. For example, in some embodiments, such as when ASR is implemented, the user phonetic content (e.g., phonemes) observed in the text-independent voiceprint may be scored (e.g., matched, compared, etc.) directly against the phonetic content (e.g., phonemes) in each of the k candidate passphrases.

By way of example, suppose the text-independent voiceprint produced "b eh t er" and there are two candidate passphrases containing the following phonemes: "b ey k er" and "1 ay t". The first candidate has two phonemes that match the text-independent voiceprint ("b" and "er"), while the second candidate has only one ("t"). In this example embodiment, the rank-ordering by the processor for these two candidate passphrases may be that the first candidate matches better (e.g., in a count-based comparison) than the second and is therefore ranked or scored higher. In other embodiments, additional and/or alternative factors may be considered by the processor such as, for example, weighting which is more important: two matches of one phoneme, or one match for two phonemes. In some embodiments, such weightings may be implemented based on one or more empirical experiments. By way of another example, in some embodiments, the processor may account for triphones (e.g., a group or sequence of 3 phonemes) instead of or in addition to plain phonemes.

In some embodiments, for example, when the state occupancy information (e.g., a state occupancy vector, as described herein) from the UBM calculation is embedded into the text-independent voiceprint of the user (as described in detail herein), the processor may simply extract, identify, or retrieve this vector to perform a match against each of the k candidate passphrases based on the various distances of the vectors of each of the k candidate passphrases as compared to the vector of the text-independent voiceprint. Those of ordinary skill the relevant art will understand that calculating a state occupancy vector is typically a required part of normal i-vector extraction; it is an intermediate piece of information that is typically discarded. In some embodiments of the invention, however, the state occupancy vector may additionally be an output of the i-vector extraction block. In some embodiments, distances between n-dimensional vectors may be calculated, for example, as cosine distances (e.g., the cosine of the angle between two vectors that begin at the origin and pass through the two points in n-dimensional space). In some embodiments, probabilistic linear discriminant analysis (PLDA) scoring, which is common in voice biometrics, may be implemented as another way to calculate the distance between two points in n-dimensional space.

Once extracted or otherwise identified, the processor may transform the phonetic content (e.g., phonetic string) associated with each of the k candidate passphrases into an estimated state occupancy vector, as described herein. Those of ordinary skill in the art will recognize that, in some embodiments, this transformation may be performed off-line, as soon as the passphrase is chosen or generated. Furthermore, this embodiment requires no extra stage of speech recognition, which, for highest accuracy, would need to be language-specific.

In some embodiments, to estimate a state occupancy vector for a candidate passphrase, e.g., to transform the phonetic content (e.g., phonetic string) associated with each of the k candidate passphrases into an estimated state occupancy vector, one or more empirical methods may be implemented. For example, in some embodiments, a speech recognition system for the same language as that of the k candidate passphrases may be required, as is example audio (e.g., of any kind) that has been transcribed. By way of example, an automatic speech recognition (ASR) system may provide low-level access to output. As such, there may be not just words, but individual phonemes and time offsets for each. There may also be time offsets for when each state of the UBM's GMM are a high likelihood. Therefore, in some embodiments, a histogram may be built, for example: "_sh" is observed 100 times in the ASR output, and GMM state 0 is active (e.g., above some threshold) 4% of the time, state 1 is active 68% of the time, state 999 is active 2% of the time, etc. Now, given a passphrase with several phonemes (or a lattice of phonemes) it is possible for the processor to sum across these and identify that state 0 would be active a certain amount, state 1 some other amount, etc. In these example embodiments, the result may be an estimated state occupancy vector.

In some embodiments, the processor may force alignment of the example audio transcript against the example audio to identify the regions in time for each phoneme in the transcript. For example, in some embodiments, instead of executing or running speech recognition, an assumption may be made that what was said is known (e.g., the audio was generated by giving a human a script to read, then recording it). One difference is that the system may be more likely to be correct when observing individual phonemes. In some embodiments, the processor may also implement the UBM for each frame of audio, allowing a state occupancy vector to be created for each short phoneme segment. In some embodiments, these vectors may be averaged (e.g., by summing across as described herein) to create an expected state occupancy vector for each phoneme. In some embodiments, these phoneme vectors may be stored, e.g., in a database.

In some embodiments, for the set of k candidate passphrases, the processor may input the associated phonetic content of each candidate passphrase (e.g., k phoneme strings representing k candidate passphrases), identify the expected vector for each phoneme in a given phoneme string (e.g., as previously saved), and calculate the expected state occupancy vector for the given phoneme string, e.g., by summing the phoneme vectors together. By way of example, in some embodiments there may be only one passphrase:

"late". This example passphrase has three phonemes: _l_ ay_t. For the purposes of this example we will assume the UBM has four states (note, a real one would typically have 500-10,000). From training data, occupation likelihoods for each state have already been computed for each phoneme: L={0.00 0.25 0.85 0.1}, AY={0.01 0.20 0.00 0.85}, T={0.00 0.85 0.10 0.10}. Note that these do not have to sum to 1.00. In some embodiments, the overall occupation vector may be, e.g., the sum of these three: {0.01 1.30 0.95 1.05}, or, e.g., the average: {0.0033 0.4333 0.3167 0.3500}. From this, it is clear that three of the four states need to be well-modeled by the voiceprint. Suppose the voiceprint about to be compared only models state 0: {0.95 0.0 0.0 0.00}. In this case, this passphrase would be a poor option to present to the customer, as the dot product of the occupation vector of the voiceprint and the estimated passphrase occupancy vector would be sum (0.95*0.01 0.0*1.3 0.0*0.95 0.0*1.05)= 0.0095+0+0+0=0.0095, which is very small. Thus, this voiceprint/passphrase combination would not be a good match.

Those of ordinary skill in the art will recognize that in some embodiments, phoneme vectors may be summed while in other embodiments phoneme vectors may be averaged. Regardless, the output is a distance between each passphrase and the voiceprint. An average is slightly different than a sum (passphrases will have different phoneme lengths, so the processor may be configured to divide by different amounts), but it is very nearly a scaled version of using a sum (and in the special case of all passphrases having the same phoneme count, the two would be identical except for the scale constant). In some embodiments, other weighting schemes additionally or alternatively may be implemented. For example, because different phonemes may also have different lengths in time, in some embodiments, weights may be assigned based on these differences.

Those of ordinary skill in the art will recognize that in some embodiments, this method may further be extended to account for contextually dependent phonemes, such as triphones. Furthermore, in some embodiments, multiple pronunciations for passphrases may be allowed and/or accounted for and the final expected occupancy vector may be weighted appropriately for each possible path through the passphrase pronunciation. For example, consider the passphrase "either," which may be pronounced "AY TH ER" or "IY TH ER" depending on the person vocalizing or saying the passphrase. For this example, the processor may compute the estimated state occupancy vector for the first pronunciation, the second pronunciation, and weight each of them. In some embodiments, the processor may weight them equally, e.g., if there is no other input that would affect the weight. In other embodiments, e.g., when there is additional input that 70% of people say "AY TH ER," processor may be configured to include this input in determining the weighting.

In these and other embodiments, the processor may calculate the distance of any candidate passphrase to the text-independent voiceprint as the distance between their occupancy vectors, as known in the art, and rank the various candidate passphrases, e.g., based on for example the distances. This may be an effective method for short duration voiceprint enrollments, e.g., as, in some embodiments, the processor may be configured to simply convert the occupancy vectors to binary, and compute the dot product.

In some embodiments, the processor may be configured to perform one or more of the above computations offline. For example, in some embodiments, a large set of k candidate passphrases may be created in advance (as described herein), each with phonetic content already determined, and expected state occupancy vectors already calculated. Similarly, in some embodiments, a state occupancy for each text-independent voiceprint may be kept while calculating the UBM, and stored with the voiceprint, so that the audio need not be retained. This would significantly reduce data store requirements, while boosting processing power, speed, and, in particular, accuracy.

Turning briefly to FIG. 3, a chart showing detection error rates for matched state occupancies versus mismatched state occupancies is provided according to embodiments of the invention. In particular, Detection Error Rate curves are shown for a system where the state occupancy of the candidate passphrase is matched (solid) and mismatched (dashed) to the state occupancy of the text-independent voiceprint to which it is being compared (e.g., detection error tradeoff (DET) curves for the top 10% best matched trials, and bottom 10%, according to UBM state occupancy). In this example implementation, the enrollment audio for the text-independent voiceprints were long calls (>40 seconds of speech), and the trials were extremely short (~3 seconds of speech). In any voice biometric system, the important operating point is on the left side of this graph, where the chance of an impostor gaining access (the False Acceptance Rate or FAR) is very low. The goal of an accurate system is to then, for a given FAR, have the lowest False Reject Rate (FRR) possible. For some embodiments of the system implementing the systems and methods according to embodiments the invention, for trials that were very-well-matched to their enrollments, at 1% FAR the FRR was 16.4%. If a passphrase was chosen, however, that was not well-matched, then the FRR dropped to 34.1%

Turning back to FIG. 2, in some embodiments, once the processor has generated the rank-ordering of each of the k candidate passphrases (e.g., dynamically in real-time or after completion of all comparisons), based on how similar the phonetic content of each of the k candidate passphrases matches the user phonetic content of the voiceprint, the processor may be configured to identify and/or select a subset of j passphrases from the set of k candidate passphrases, identify a subset of phrases from the plurality of phrases, in which each of the subset of phrases matches phoneme sequence in a user voiceprint. In some embodiments, the processor may be configured to identify and/or select the subset of j passphrases from the set of k candidate passphrases, e.g., based on the rank-ordering e.g., selecting, by the processor, the subset of j passphrases which meet the match threshold in phonetic content with the voiceprint of the user). For example, in some embodiments, a predefined match threshold may be implemented such that only candidate passphrases whose phonetic content meets or equals (and/or exceed) the match threshold are identified and, for example, stored in a repository for use during a user authentication. For example, in some embodiments a match threshold may be defined by taking a set of passphrases and voiceprints from a development system, computing the distances between all possible combinations, and picking, for example, the distance that ensures results are in the top-10% closest matches. This threshold, found on this development set of passphrases and voiceprints, may then be used in the future, e.g., in the production system. In some embodiments, the match threshold may be based on, e.g., a relative comparison of phonemes, a proximity of occupancy vectors, etc., as described herein.

In some embodiments, the distance from a text-independent voiceprint to each candidate passphrase, e.g., for purposes of meeting or equaling (and/or exceeding) the match threshold may be pre-computed, so that effectively all processing required to generate the rank-order of candidate passphrases is completed off-line in advance. This allows pre-selection of the subset of j passphrases, as described herein, that are to be used with a given text-independent voiceprint. In this case, the subset may be stored, e.g., in a repository, as metadata with the voiceprint, and the processor may simply select, e.g., at random or based on some predefined criteria, a phrase from the subset of passphrases associated with the voiceprint, as described herein.

In some embodiments, at step 270, either prior to or during a user authentication, the processor may select a first one of the subset of j passphrases. In some embodiments, the processor may be configured to randomly select a first one of the subset of j passphrases, for example, by implementing a random selection algorithm to ensure randomness. In some embodiments, the processor may be configured to select a first one of the subset of j passphrases based on some predefined criteria, such as, e.g., a skipping pattern or least used passphrase, etc. In some embodiments, multiple criteria may be used for selection, etc., and/or random selection may be intermittently implemented.

In some embodiments, at step 280, the processor may present, provide, and/or display the selected first one of the subset of j passphrases to the user for use in the user authentication. For example, during a call between a user and a company implementing systems and methods according to embodiments of the invention, the user may be prompted to provide a customer identification number (ID). In response to receiving the ID, the processor may be configured to retrieve, e.g., from a database or repository, the subset of j passphrases which have been previously identified for the or associated with specific user (customer), select, e.g., randomly, a first one of the subset of j passphrases, and provide the selected passphrase to the user for comparison (e.g., by way of an audio, text, or visual prompt).

In some embodiments, at step 290, e.g., once the processor has prompted the user to verbally articulate (e.g., voicing) the selected first one of the subset of j passphrases, e.g., for authentication purposes, the verbal articulation of the selected first one of the subset of j passphrases may be captured, e.g., recorded by a recording device and/or stored in a database by the processor, and the processor may then authenticate the user, as described herein, based on the verbally articulated selected first one of the subset of j passphrases and the text-independent voiceprint previously provided by user. Furthermore, in some embodiments, the processor may be configured to select a second one of the subset of j passphrases and present or display the selected second one of the subset of j passphrases to the user for use, e.g., in a subsequent user authentication. Of course, the subsequent user authentication may be during the same or a different user interaction or call. For example, some systems may require multiple authentications. Furthermore, in some embodiments, a different one of the subset of j passphrases may be selected and provided to the user each time the user calls, which significantly lowers the risk of fraud as passphrases are unknown the user before the user is prompted.

While aspects of the invention may relate to human activity, e.g., the recording of a voiceprint of a user, etc., embodiments of the invention provide significant improvements to both the underlying computing systems (e.g., voice biometric systems, self-service systems, and/or IVR channels), as well as to other systems and industries. For example, in various embodiments, the underlying computing systems on which embodiments of the invention may be executed may conserve virtual and/or physical memory by, e.g., obviating the need to store multiple voice recordings. Furthermore, embodiments of the invention greatly improve the functionality and effectiveness of the processor(s) on which embodiments of the invention are executed, as the processing power typically required to "teach" these systems to recognize a voiceprint of a user is greatly reduced. Additionally, by increasing accuracy in the authentication process, unnecessary processing is avoided.

Furthermore, embodiments of the invention provide significant improvements to other systems and industries. For example, the embodiments of the invention provide significant improvements to the security industry, the banking industry, the service industry (e.g., in call center environments). For example, a significant security flaw prevalent in legacy (prior) systems in these and other industries is these systems compare an input passphrase (e.g., during a call) with a stored recording of the passphrase, providing a fraudster the opportunity to identify and pre-record the passphrase prior to it being requested during a call. However, by employing the systems and methods as described herein according to embodiments of the invention, passphrases may be changed at any time, significantly increasing security, as pre-recording a passphrase is more difficult, since a fraudster does not know until the time of the call what the passphrase will be.

Unless explicitly stated, the method embodiments described herein are not constrained to a particular order or sequence. For example, it will be readily understood by those of ordinary skill in the relevant art that, in various embodiments, the steps of generating the set of k candidate passphrases (step 230) and/or calculating a phonetic content of each candidate passphrase of the set of k candidate passphrases (step 240), being independent of the enrollment-related steps of capturing and/or recording audio of a user during a historical call (step 210) and generating a text-independent voiceprint of the user based on the audio capturing/recording (step 220), may be executed by the processor before and/or concurrently with step 210 and/or step 220.

Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for optimizing matched voice biometric passphrases, performed on a computing device having a processor, memory, and one or more code sets stored in the memory and executing in the processor, the method comprising:

generating, by the processor, a plurality of k candidate passphrases;

calculating, by the processor, a phonetic content of each candidate passphrase of the plurality of k candidate passphrases;

capturing a text-independent voiceprint of a user;

calculating, by the processor, a user phonetic content of a text-independent voiceprint of the user;

rank-ordering each of the plurality of k candidate passphrases based on how similar the phonetic content of each of the k candidate passphrases is to the user phonetic content of the text-independent voiceprint of the user;

identifying, by the processor, a subset of j passphrases based on the rank-ordering from the plurality of k candidate passphrases, wherein each of the subset of j passphrases meets a match threshold in phonetic content with the voiceprint of the user;

selecting, by the processor, a first one of the subset of j passphrases; and presenting, by the processor, the selected first one of the subset of j passphrases to the user for use in the user authentication.

2. The method as in claim 1, wherein calculating, by the processor, the phonetic content of each candidate passphrase of the plurality of k candidate passphrases comprises:

comparing, by the processor, each candidate passphrase of the plurality of k candidate passphrases against a pronunciation lexicon;

based on the comparison, identifying, by the processor, the pronunciation of each phoneme in each candidate passphrase of the plurality of k candidate passphrases; and generating, by the processor, a phoneme string representing each candidate passphrase of the plurality of k candidate passphrases.

3. The method as in claim 1, wherein calculating, by the processor, the phonetic content of the text-independent voiceprint of a user comprises:

comparing, by the processor, the text-independent voiceprint against a pronunciation lexicon;

based on the pronunciation lexicon, identifying, by the processor, the pronunciation of each phoneme in the text-independent voiceprint; and generating, by the processor, a phoneme string representing the text-independent voiceprint.

4. The method as in claim 1, wherein calculating, by the processor, the phonetic content of the text-independent voiceprint of a user comprises:

extracting, by the processor, a Universal Background Model (UBM) state occupancy vector from the text-independent voiceprint; and based on the UBM state occupancy, generating, by the processor, a phoneme string for the text-independent voiceprint.

5. The method as in claim 4, further comprising:

transforming the phonetic content of each candidate passphrase of the plurality of k candidate passphrases into an estimated state occupancy vector;

comparing the distance between each estimated state occupancy vector and the Universal Background Model (UBM) state occupancy vector;

ranking, by the processor, each candidate passphrase of the plurality of k candidate passphrases based on the distance; and selecting, by the processor, the subset of j passphrases within a threshold distance.

6. The method as in claim 1, further comprising:

prompting, by the processor, the user to verbally articulate the selected first one of the subset of j passphrases to the user for use in the user authentication; and authenticating, by the processor, the user based on the verbally articulated selected first one of the subset of j passphrases and the voiceprint of the user.

7. The method as in claim 1, further comprising:

selecting, by the processor, a second one of the subset of j passphrases; and presenting the selected second one of the subset of j passphrases to the user for use in a subsequent user authentication.

8. The method as in claim 7, wherein at least one of the first one of the subset of j passphrases and the second one of the subset of j passphrases is selected randomly.

9. A system for optimizing matched voice biometric passphrases, comprising:

a computer having a processor and a memory; and one or more code sets stored in the memory and executed by the processor, which configure the processor to:

generate a plurality of k candidate passphrases;

calculate a phonetic content of each candidate passphrase of the plurality of k candidate passphrases;

capture a text-independent voiceprint of a user;

calculate user phonetic content of a text-independent voiceprint of the user;

rank each of the k candidate passphrases based on how similar the phonetic content of each of the k candidate passphrases is to the user phonetic content of the text-independent voiceprint of the user;

identify a subset of j passphrases based on the rank-ordering from the plurality of k candidate passphrases, wherein each of the subset of j passphrases meets a match threshold in phonetic content with the voiceprint of the user;

select a first one of the subset of j passphrases; and present the selected first one of the subset of j passphrases to the user for use in the user authentication.

10. The system as in claim 9, wherein, when calculating the phonetic content of each candidate passphrase of the plurality of k candidate passphrases, the processor is configured to:

compare each candidate passphrase of the plurality of k candidate passphrases against a pronunciation lexicon;

based on the comparison, identify the pronunciation of each phoneme in each candidate passphrase of the plurality of k candidate passphrases; and generate a phoneme string representing each candidate passphrase of the plurality of k candidate passphrases.

11. The system as in claim 9, wherein, when calculating the phonetic content of the text-independent voiceprint of a user, the processor is configured to:

compare the text-independent voiceprint against a pronunciation lexicon;

based on the pronunciation lexicon, identify the pronunciation of each phoneme in the text-independent voiceprint; and generate a phoneme string representing the text-independent voiceprint.

12. The system as in claim 9, wherein, when calculating the phonetic content of the text-independent voiceprint of a user, the processor is configured to:

extract a Universal Background Model (UBM) state occupancy vector from the text-independent voiceprint; and based on the UBM state occupancy, generate a phoneme string for the text-independent voiceprint.

13. The system as in claim 12, the processor further configured to:
- transform the phonetic content of each candidate passphrase of the plurality of k candidate passphrases into an estimated state occupancy vector;
- compare the distance between each estimated state occupancy vector and the Universal Background Model (UBM) state occupancy vector;
- rank each candidate passphrase of the plurality of k candidate passphrases based on the distance; and
- select the subset of j passphrases within a threshold distance.

14. The system as in claim 9, the processor further configured to:
- prompt the user to verbally articulate the selected first one of the subset of j passphrases to the user for use in the user authentication; and
- authenticate the user based on the verbally articulated selected first one of the subset of j passphrases and the voiceprint of the user.

15. The system as in claim 9, further configured to:
- select a second one of the subset of j passphrases; and
- present the selected second one of the subset of j passphrases to the user for use in a subsequent user authentication.

16. The method as in claim 15, wherein at least one of the first one of the subset of j passphrases and the second one of the subset of j passphrases is selected randomly.

17. A method for creating voice passphrases, the method comprising:
- generating, by a computer processor, a plurality of candidate phrases, each candidate phrase comprising a plurality of words;
- calculating, by the processor, a phoneme sequence of each phrase;
- capturing a text-independent voiceprint of a user;
- calculating, by the processor, a user phoneme sequence of the text-independent voiceprint of the user;
- rank-ordering each of the plurality of candidate phrases based on how similar the phoneme sequence of each of the candidate phrases is to the user phoneme sequence;
- identifying, by the processor, a subset of phrases from the plurality of phrases based on the rank-ordering, wherein each of the subset of phrases matches in phonetic content based on a threshold with the text-independent voiceprint of the user;
- selecting, by the processor, a first one of the subset of phrases;
- providing, by the processor, the selected phrase to the user; and
- receiving authentication from the user voicing the selected phrase.

18. The method as in claim 17, wherein identifying, by the processor, the subset of phrases from the plurality of phrases comprises:
- ranking, by the processor, the plurality of phrases by similarity in phonetic content with the voiceprint of the user; and
- selecting, by the processor, the subset of phrases which meet a match threshold in phonetic content with the voiceprint of the user.

* * * * *